United States Patent
Gross

(10) Patent No.: US 9,868,251 B2
(45) Date of Patent: Jan. 16, 2018

(54) METHOD FOR PRODUCING PLASTIC CONTAINERS

(71) Applicant: MAGNA STEYR Fuel Systems GesmbH, Sinabelkirchen (AT)

(72) Inventor: Joerg Gross, Wesseling (DE)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 83 days.

(21) Appl. No.: 14/949,956

(22) Filed: Nov. 24, 2015

(65) Prior Publication Data
US 2016/0144559 A1   May 26, 2016

(30) Foreign Application Priority Data

Nov. 24, 2014   (EP) .................................... 14194475

(51) Int. Cl.
| | | |
|---|---|---|
| *B65B 7/00* | (2006.01) | |
| *B29C 47/00* | (2006.01) | |
| *B29C 65/00* | (2006.01) | |
| *B32B 37/00* | (2006.01) | |
| *C08J 5/00* | (2006.01) | |
| *B31F 5/00* | (2006.01) | |
| *B65H 29/00* | (2006.01) | |

(Continued)

(52) U.S. Cl.
CPC ............ *B29C 66/54* (2013.01); *B29C 31/008* (2013.01); *B29C 65/20* (2013.01); *B29C 65/7802* (2013.01); *B29C 65/7847* (2013.01); *B29C 66/1142* (2013.01); *B29C 66/73921* (2013.01); *B29C 66/83221* (2013.01); *B29C 66/87* (2013.01); *B29C 65/02* (2013.01); *B29K 2101/12* (2013.01); *B29K 2105/253* (2013.01); *B29L 2031/712* (2013.01); *B29L 2031/7158* (2013.01); *B29L 2031/7172* (2013.01); *B29L 2031/7496* (2013.01)

(58) Field of Classification Search
CPC ......... B29C 65/00; B29C 65/02; B29C 65/18; B29C 65/7847; B29C 66/00; B29C 66/1142; B29C 66/54; B29C 66/542; B29L 2031/712; B29L 2031/7154; B29L 2031/7156; B29L 2031/7172; B60K 15/03177; B60K 2015/03032; B29D 22/003; B25J 15/0616

USPC ... 156/60, 69, 145, 146, 228, 242, 245, 285, 156/292, 304.1, 304.2, 304.5, 304.6, 156/308.2, 308.4, 309.6, 349, 538, 539, 156/556; 414/752.1, 627, 737; 294/183, 294/185, 188

See application file for complete search history.

(56) References Cited

FOREIGN PATENT DOCUMENTS

| | | |
|---|---|---|
| CN | 1031048 A | 2/1989 |
| CN | 1205668 A | 1/1999 |

(Continued)

OTHER PUBLICATIONS

Office Action for Chinese Patent Application No. 201510717487.X, dated May 4, 2017, 9 pages including 5 pages of English translation.

*Primary Examiner* — Philip Tucker
*Assistant Examiner* — Brian R Slawski
(74) *Attorney, Agent, or Firm* — Jordan IP Law, LLC; Todd A. Vaughn

(57) ABSTRACT

A method for producing a plastics material container from half-shells. The half-shells are aligned at respective edges thereof in at least two directions in space, and then at joined by being butt welded together at the respective edges thereof.

18 Claims, 2 Drawing Sheets

(51) Int. Cl.
  *B65G 1/133*   (2006.01)
  *B25J 15/06*   (2006.01)
  *B29C 65/20*   (2006.01)
  *B29C 65/78*   (2006.01)
  *B29C 31/00*   (2006.01)
  B29C 65/02    (2006.01)
  B29L 31/00    (2006.01)
  B29K 101/12   (2006.01)
  B29K 105/00   (2006.01)

(56)  References Cited

FOREIGN PATENT DOCUMENTS

| | | | |
|---|---|---|---|
| CN | 203427321 U | 2/2014 | |
| DE | 3814516 C1 * | 3/1989 | ......... B29C 65/7802 |
| DE | 69901868 T2 | 1/2003 | |

* cited by examiner

METHOD FOR PRODUCING PLASTIC CONTAINERS

CROSS-REFERENCE TO RELATED APPLICATIONS

The present application claims priority 35 U.S.C. §119 to European Patent Publication No. EP EP14194475.1 (filed on Nov. 24, 2014), which is hereby incorporated by reference in its entirety.

TECHNICAL FIELD

Embodiments relate to a method for producing plastics material containers from a pair of half-shells, the half-shells being butt welded together at their edges.

BACKGROUND

Hollow bodies produced from plastics material, such as, for example, canisters tanks and bottles, can be produced as a result of extrusion blow moulding. In this connection, first of all a hose is extruded from plasticized plastics material which is enclosed in a blow mould with a cavity which corresponds to the hollow body contour and is ballooned until it abuts against the cavity wall. Once a cooling time which is sufficient for achieving dimensional stability has been reached, the hollow body can be removed from the mould. A disadvantage of this method is the considerable expenditure on equipment, to which the clamping unit, the accumulator head, the blow mould, the regulations on wall thickness, the waste disposal device and the expanding device contribute. The different proportion of waste depending on the development of the hollow body has to be returned into the process again. A further disadvantage is the slower cooling of the inside of the hollow body as heat dissipation toward the blow air side is effected in a retarded manner.

German Patent Publication No. DE 1809990 A1 describes a method for producing plastics material containers where in a first step at least one pair of complementary hollow body parts are formed in one shot by injection moulding and in a second stage said hollow body parts are brought together and joined thus forming the cavity.

The hollow body parts remain in the outer moulds once the injection mould has been opened and are transferred with said outer moulds into an external joining station and there are joined non-detachably along their edges. As a result of injection moulding the hollow body halves, cooling is achieved quicker than in the case of blow moulding such that the cycle time is able to be reduced in a considerable manner. The wall thickness is predefined precisely by the cavity, and the proportion of waste is very small. In general, two mirror-symmetrical hollow body halves are formed which are joined along their edges to form the hollow body. In this case, the two halves can comprise differently realized edges, if this is necessary for the joining of the two halves. For example, overlaps or a reciprocal engagement in the form of a tongue and groove can be realized on the edges.

The processing of plastic sheets as a result of thermoforming where thermoplastic plastics materials are usually reshaped in the heated state, for example, deep-drawn in a vacuum, is additionally known. Sheets which are produced with nozzles for sheet or film extrusion of plastics materials and other plasticizable and hardenable materials are fundamental in this case. The material is usually heated up first of all and in the plastic state is pressed through the nozzle, between a nozzle bottom part and a nozzle top part, in order, after a cooling and hardening stage, to obtain a sheet which corresponds as precisely as possible to predefined dimensions.

Irrespective of from which method of production the parts of a large plastics material tank originate, the half-shells which are produced using the different methods have to be joined to one another in a process downstream. For example, hot plate welding is used for hollow containers which consist of two injection moulded plastics material half-shells. On account of the different tolerances of the half-shells, a joining tool must be provided in order to move the two container half-shells into a forced position. For the use of such a joining tool, an additional edge geometry, in particular a U-shaped profile, is provided along which the edges of the half-shells are welded.

In many applications it is desirable for the container half-shells to define as large a volume as possible. As the installation space in the vehicle is always limited, the use of a circumferential edge for the application of a joining tool is disadvantageous as the volume of the container is reduced here. The space formed by the edge is also unavailable for accommodating a liquid.

In order to fill out the installation space as well as possible, container half-shells are placed end to end on top of one another and are thus welded. The problem existing here is that the large-volume plastics material half-shells have high tolerances and bend and warp when being processed as a result of their own elasticity.

SUMMARY

In accordance with embodiments, a method for producing large-volume plastics material containers is provided, which places the edges of the plastics material half-shells end-to-end in a precise manner, one on top of the other, and then welding them in this position.

In accordance with embodiments, a method for producing plastics material containers from two half-shells includes butt-welding two half-shells together at respective edges thereof, wherein the edges of the half-shells are subject to an alignment and wherein vacuum grippers cooperate with the half-shells in at least two axial directions.

In accordance with embodiments, a method for producing a container composed of plastic includes at least one of: aligning the half-shells with respect to one another in at least two directions in space; transporting the aligned half-shells to a joining station; and joining the aligned half-shells at respective edges thereof.

In accordance with embodiments, a method for producing a container includes at least one of: aligning half-shells composed of plastic with respect to one another in at least two directions in space; and joining the aligned half-shells at respective obtuse edges thereof.

In accordance with embodiments, a method includes at least one of: aligning half-shells composed of plastic with respect to one another in at least two directions in space; and producing a container by joining the aligned half-shells at respective edges thereof.

The use of vacuum grippers achieves both a transporting function of the half-shells and the alignment as a result of generating traction or pressure onto the edge regions of the half-shells. As a result, the edges can be aligned to the required dimension and the required form.

It is additionally advantageous for the vacuum grippers to engage from inside the half-shell and/or from outside the half-shell. As a result of the vacuum grippers engaging on the inside, the half-shell is aligned on a horizontal stop member in a first direction in space. With the outer vacuum grippers the half-shell aligned in an optimum manner in a second direction in space.

It is particularly advantageous when the vacuum grippers engage in planes which are perpendicular with respect to one another.

Alternatively, the vacuum grippers may engage in planes which are not perpendicular with respect to one another, which is also associated with the form of the half-shell to be aligned.

The vacuum grippers fulfill both transporting tasks and aligning tasks, which results in a simple method of production and a reduction in the machine parts required.

In order to optimize the operational sequence, it is important for the vacuum grippers first of all to engage from the inside and then further vacuum grippers to fix the half-shells of the plastic container from the outside. Optimum alignment is achieved as a result.

The two plastics material container half-shells are aligned with respect to one another only by way of the horizontal vacuum grippers and are welded together at the obtuse edges of the half-shells.

The method in accordance with embodiments makes it possible for the two plastics material container half-shells to be heated at the obtuse edges and moved toward one another and fixed.

DRAWINGS

Embodiments will be illustrated by way of example in the drawings and explained in the description below.

DESCRIPTION

Figure 1:
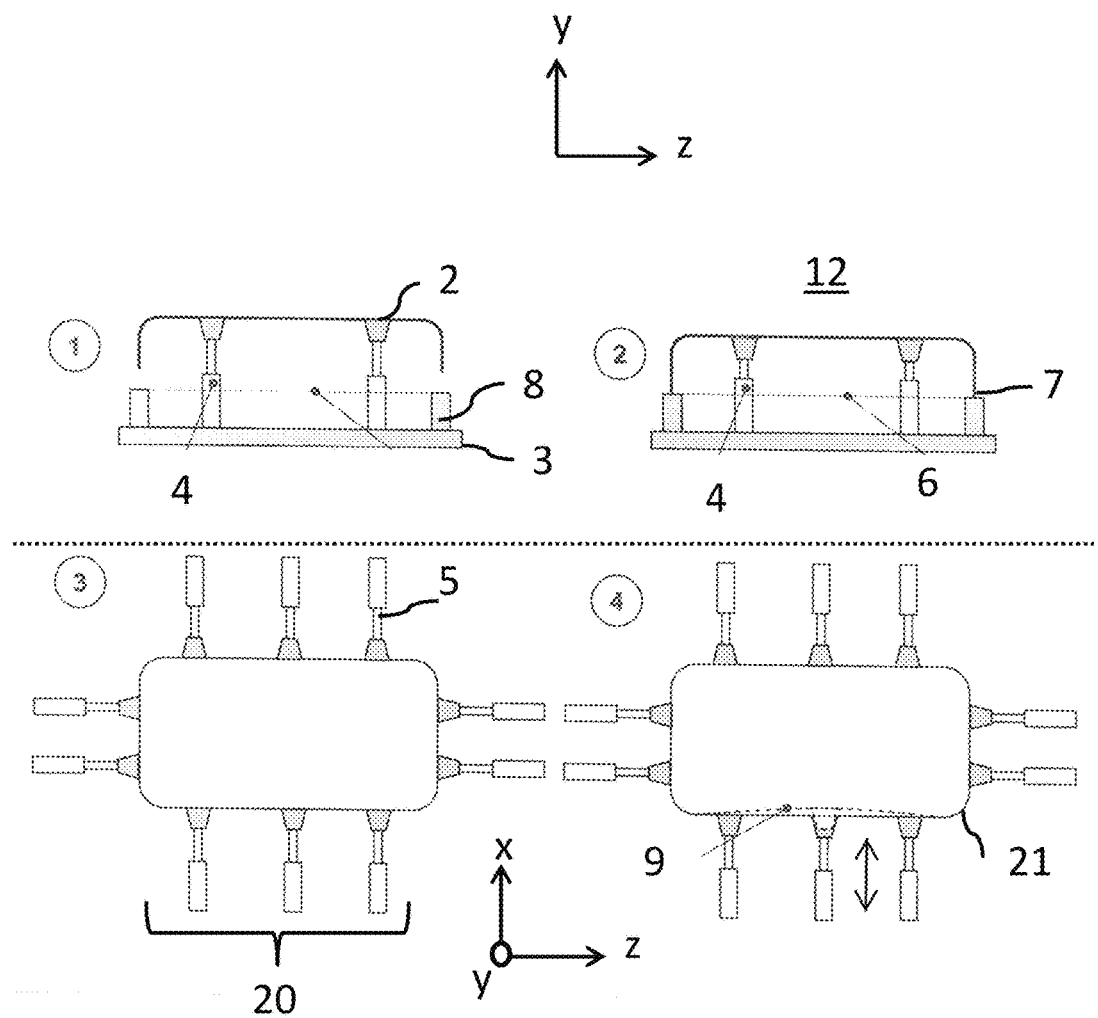
FIG. 1 illustrates a schematic representation of a receiving device, in accordance with embodiments.

As illustrated in the top half of FIG. 1, a sectional view of a component aligning device 12 in the y-z plane. A half-shell 2 of a material container 1 composed, for example, of a plastic material, is produced in accordance with a known method.

After producing the half-shell 2, the half-shell 2, either still in a warm state or in a cool state, is moved into the component aligning device 12. The component aligning device 12 includes a component receiving device 3 having a circumferential edge 8 which corresponds to a required contour of the half-shell 2. Inside the component receiving device 3 there is a suitable number of vertical vacuum grippers 4, two vacuum grippers 4 being illustrated here, for example. In accordance with embodiments, the vacuum grippers 4 may be controllable using an appropriate control device.

In method blocks 1 and 2, the half-shells 2 are placed in each case on the component receiving device 3 with their open side, that is to say the future interior, facing downwardly. The half-shell 2 is taken up by the vertical vacuum grippers 4 and moved in the y-direction toward the edge 8. The edge 7 of the half-shells is thereby aligned on the horizontal stop member 6 on the component receiving device 3 by the individually actuatable, vertically movable vacuum grippers 4. The position, in this case, may be measured visually or may be determined using stop member sensors on the edge and the vacuum grippers 4 can consequently be controlled.

The section plane in FIG. 1 is displaced into the x-z plane for method blocks 3 and 4. Still whilst the vertical vacuum grippers 4 are fixing the component, the half-shell 2, on the horizontal stop member, horizontally moveable vacuum grippers 5 are applied to the half-shell 2 along the outside surface of the half-shell 2.

Figure 2:
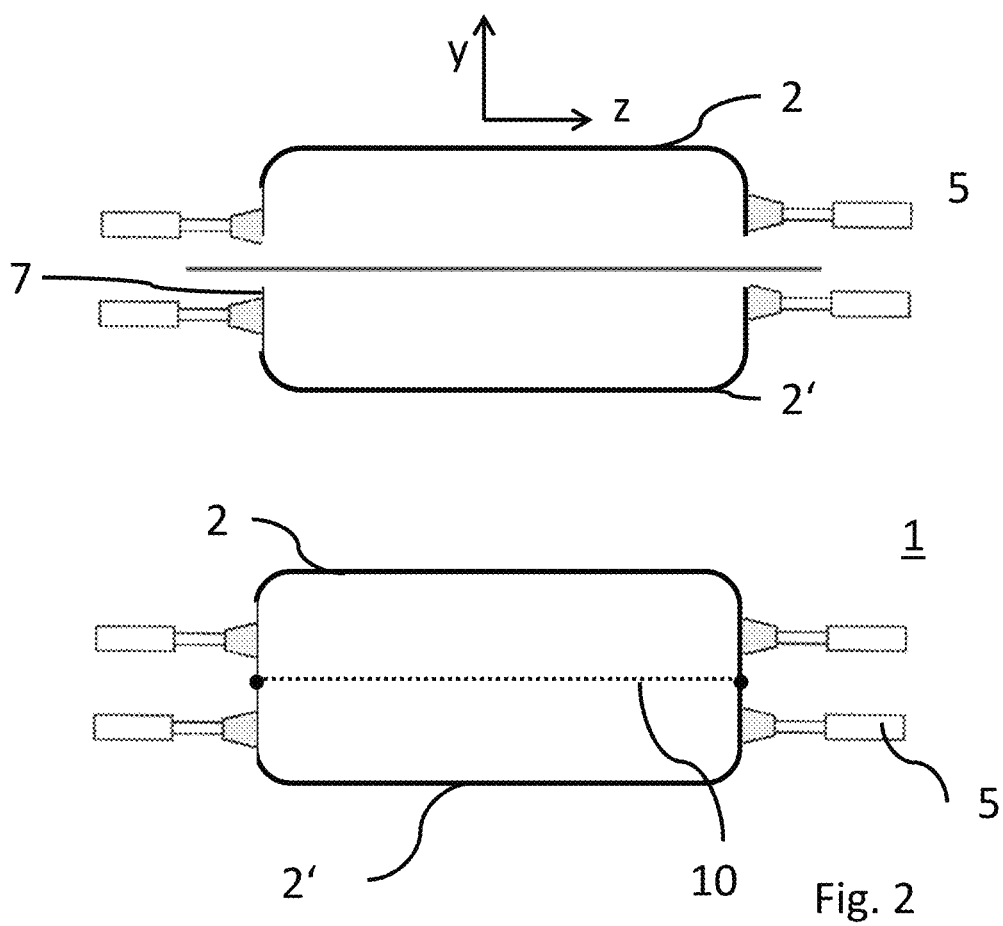
FIG. 2 illustrates a method step of a welding procedure, in accordance with embodiments.

As illustrated in FIG. 2, in this case, two vacuum grippers 5 can be seen in each case on the narrow sides 2, 3 vacuum grippers 5 can be seen in each case on the longitudinal sides. The individual vacuum grippers 4, 5 are fastened to a gripper system 20, and are arranged such that the individual vacuum grippers 4, 5 are able to act with traction and pressure on the contour of the half-shell 2. Consequently, wall portions of the half-shell 2 may be aligned in their position by the individually arranged and actuatable vacuum grippers 5.

As illustrated in FIG. 1, in method block 4, the situation on the bottom edge is shown—the middle vacuum gripper 5 exerting traction onto the wall of the half-shell 2 in order to eliminate the deforming 9 of the half-shell 2. The outer contour 21 of the half-shell is the result of a required contour which can be determined, for example, by visual measurement. Alternatively, the use of a frame-like stop member on the edge 8 of the component receiving device 3 is also possible.

In accordance with embodiments, the vertical and horizontal vacuum grippers 4, 5 are arranged perpendicular with respect to one another. Consequently, the design of the gripper system 20 and of the component receiving device 3 is certainly simpler than if the vacuum grippers 4, 5, were arranged along further directions in space. In a case where the half-shells 2 have more complicated forms, however, it is possible for the two directions in space in which the vacuum grippers 4, 5 are arranged not to extend perpendicular with respect to one another. The vacuum grippers 4, 5, moreover, may be arranged along further directions in order to align the half-shells 2 in an optimum manner.

The number of vacuum grippers 4, 5 is also only shown as an example. Any number that is necessary but still makes sense within the method, be it symmetrical or asymmetrical, is conceivable in accordance with embodiments.

As soon as the aligning of the half-shell 2 is completed, the vertical vacuum grippers 4 are withdrawn and the half-shell 2 is transported into the component welding device just by the horizontal vacuum grippers 5. In this case, a half-shell 2 is pivoted such that the opening faces the second half-shell 2' to which it will be joined. The edges 7 of the half-shells 2, 2' are positioned at a spacing one above the other.

The two half-shells are positioned by way of an automated process such that the upper half-shell 2 and the lower half-shell 2' are aligned with respect to one another with their welding planes, but there still being a sufficiently large spacing between the half-shells 2, 2' in order to be able to move in a welding plate. Once the welding plate is in position, both container half-shells 2, 2' are then pressed from above and below onto the welding plate.

After a corresponding heating-up time, the container half-shells 2, 2' are removed in the y-direction from the welding plate and the welding plate is moved in the z-direction out of the gap between the half-shells 2, 2'. The half-shells 2, 2' are joined in the following step.

It is also possible, procedurally, to incorporate a solution in which the half-shells 2, 2' are positioned above and below the welding plate and are heated, then are moved further horizontally in the z-direction into a joining station, and there are pressed against one another, and thus, are welded. The welding process may also be effected in an alternative manner using any method that is familiar to the person skilled in the art. The important point in this case is that the edges 7 of the half-shells are butt jointed.

Figure 3:
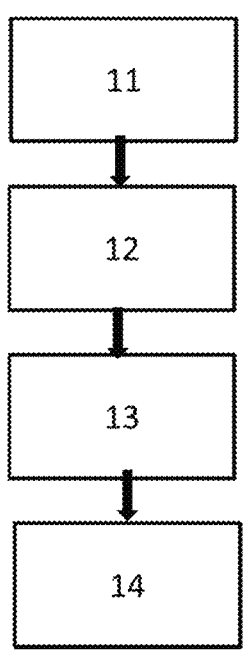
FIG. 3 illustrates a schematic representation of the entire production sequence, in accordance with embodiments.

As illustrated in FIG. 3, the entire method is shown schematically. The individual production stations in this case are: producing lithe half-shell, aligning 12 the half-shell, joining 13 the half-shells via, for example, a component welding device in order to produce the container, and then removing 14 the container.

Steps for providing the plastics material containers with further components such as sensors, pumps, lines etc. are additionally incorporated into the process.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Plastics material container
2, 2' Half-shells
3 Component receiving device
4 Vertical vacuum gripper
5 Horizontal vacuum gripper
6 Horizontal stop member
7 Edge
8 Support
9 Deforming
10 Welding line
11 Production of the half-shell
12 Component aligning device
13 Component welding device
14 Removal
20 Gripper system
21 Contour

What is claimed is:

1. A method for producing a container composed of plastic, the method comprising:
aligning half-shells with respect to one another in at least two directions in space;
transporting the aligned half-shells to a joining station via vacuum grippers, wherein some of the vacuum grippers are configured to engage the half-shells from an inside surface of the half-shells, while other vacuum grippers are configured to engage the half-shells from an outside surface of the half-shells; and
joining the aligned half-shells at respective edges thereof.

2. The method of claim 1, wherein the aligning the half-shells is conducted via the vacuum grippers which are configured to engage the half-shells from the inside surface and from the outside surface of the half-shell.

3. The method of claim 2, wherein the vacuum grippers which engage the half-shells from either the inside surface or the outside surface of the half-shell are configured to engage in planes which are perpendicular with respect to one another.

4. The method of claim 2, wherein the vacuum grippers which engage the half-shells from either the inside surface or the outside surface of the half-shell are configured to engage in planes which are not perpendicular with respect to one another.

5. The method of claim 2, wherein the half-shells are aligned with respect to one another by way of horizontally-moveable vacuum grippers.

6. The method of claim 1, wherein the vacuum grippers which engage the half-shells from either the inside surface or the outside surface of the half-shell are configured to engage in planes which are perpendicular with respect to one another.

7. The method of claim 1, wherein the vacuum grippers which engage the half-shells from either the inside surface or the outside surface of the half-shell are configured to engage in planes which are not perpendicular with respect to one another.

8. The method of claim 1, wherein joining the half-shells comprises welding the half-shells at the respective edges thereof.

9. A method for producing a container, the method comprising:
aligning half-shells composed of plastic with respect to one another in at least two directions in space;
transporting the half-shells via vacuum grippers, wherein some of the vacuum grippers are to engage the half-shells from an inside surface of the half-shells, while other vacuum grippers are to engage the half-shells from an outside surface of the half-shells; and
joining the aligned half-shells at respective obtuse edges thereof.

10. The method of claim 9, wherein joining the half-shells comprises welding the half-shells at the obtuse edges thereof.

11. The method of claim 9, wherein joining the half-shells comprises:
heating the half-shells at the obtuse edges thereof;
moving the half-shells toward one another; and
joining the half-shells.

12. The method of claim 9, wherein the aligning the half-shells is conducted via the vacuum grippers which engage the half-shells from the inside surface of the half-shell and from an outside surface of the half-shell.

13. The method of claim 12, wherein the vacuum grippers which engage the half-shells from either the inside surface or the outside surface of the half-shell engage in planes which are perpendicular with respect to one another.

14. The method of claim 12, wherein the vacuum grippers which engage the half-shells from either the inside surface or the outside surface of the half-shell engage in planes which are not perpendicular with respect to one another.

15. The method of claim 12, further comprising transporting the half-shells via the vacuum grippers after aligning the half-shells and before joining the half-shells.

16. The method of claim 9, wherein the half-shells are aligned with respect to one another by way of horizontally-moveable vacuum grippers.

17. The method of claim 9, wherein joining the half-shells comprises welding the half-shells at the respective obtuse edges thereof.

18. A method, comprising:
- aligning half-shells composed of plastic, via vacuum grippers which are to engage the half-shells, with respect to one another in at least two directions in space;
- transporting the half-shells via the vacuum grippers, wherein some of the vacuum grippers are to engage the half-shells from an inside surface of the half-shells, while other vacuum grippers are to engage the half-shells from an outside surface of the half-shells; and
- producing a container by joining the aligned half-shells at respective edges thereof.

\* \* \* \* \*